(12) United States Patent
Mori

(10) Patent No.: US 6,221,496 B1
(45) Date of Patent: Apr. 24, 2001

(54) RETROREFLECTIVE SHEET

(75) Inventor: Yutaka Mori, Mishima (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 08/972,594

(22) Filed: Nov. 18, 1997

(30) Foreign Application Priority Data

Nov. 19, 1996 (JP) .................................................. 8-307821

(51) Int. Cl.$^7$ ............................... B32B 15/08; B32B 5/16; B32B 17/08; G02B 5/12
(52) U.S. Cl. ......................... 428/439; 428/460; 428/325; 428/464; 428/457; 359/515; 40/200
(58) Field of Search .......................... 359/515, 529, 359/534, 536, 535, 538, 539–542, 546; 404/14; 40/200, 208; 428/195, 201, 204, 209, 161, 172, 354, 457, 913, 460, 402.24, 426, 432, 437, 439, 464, 532, 164, 203, 325, 327, 461; 156/230, 232, 233, 234, 241; 264/1, 9, 176.1

(56) References Cited

U.S. PATENT DOCUMENTS

| | | | |
|---|---|---|---|
| 3,790,431 | * | 2/1974 | Tung ...................................... 161/3.5 |
| 3,934,065 | * | 1/1976 | Tung ...................................... 428/241 |
| 4,418,110 | | 11/1983 | May et al. ............................ 428/143 |
| 4,505,967 | | 3/1985 | Bailey ................................... 428/164 |
| 4,725,494 | * | 2/1988 | Belisle et al. ........................ 428/325 |
| 4,950,525 | * | 8/1990 | Bailey ................................... 428/164 |
| 4,983,436 | | 1/1991 | Bailey et al. ............................ 428/40 |
| 5,008,142 | * | 4/1991 | Wilson et al. ........................ 428/203 |
| 5,256,721 | | 10/1993 | Wilson et al. ........................ 524/539 |
| 5,514,441 | * | 5/1996 | Pohto et al. ............................ 428/72 |
| 5,601,915 | * | 2/1997 | Ochi et al. ............................ 428/323 |
| 5,812,317 | | 9/1998 | Billingsley et al. .................. 359/536 |
| 5,866,236 | * | 2/1999 | Faykish et al. ........................ 428/195 |

FOREIGN PATENT DOCUMENTS

| | | | |
|---|---|---|---|
| 0 672 921 A2 | 9/1995 | (EP) | ............................... G02B/5/128 |
| 0 699 519 A2 | 3/1996 | (EP) | ............................... B32B/27/08 |
| 59-5051 | 1/1984 | (JP) | ................................. B32B/3/18 |
| 2545437 | 11/1988 | (JP) | ................................. B32B/7/02 |

* cited by examiner

Primary Examiner—Deborah Jones
Assistant Examiner—Michael LaVilla
(74) Attorney, Agent, or Firm—Doreen S. L. Gwin

(57) ABSTRACT

To provide a retroreflective sheet which is suitable for co-molding by injection molding or the like, wherein the retroreflective sheet can be laid within a mold and molded with a resin to form a molded product, and, after molding, the sheet retains a significant portion of its reflection luminance and appearance as compared with the reflection luminance value before molding.

A retroreflective sheet used for a co-molding, comprising a metallic reflective layer, a microspherical lens layer disposed as a single layer, and a transparent focal resin layer disposed between the reflective layer and the microspherical lens layer, in which the focal resin layer comprises a mixture of cellulose ester and polyvinyl butyral resin.

12 Claims, 5 Drawing Sheets

ENTRANCE ANGLE

RETROREFLECTIVE SHEET

TECHNICAL FIELD

The present invention relates to a retroreflective sheet for use on traffic signs, which enables safe utilization of roads at night, or labels, stickers, emblems or the like for vehicles or decorative purposes. More particularly, the present invention relates to a sealed lens type retroreflective sheet which is suitable for co-molding by injection molding, blow molding or the like wherein a retroreflective sheet can be placed within a mold for a curved substrate and molded with a resin to form a molded product having a curved surface, and, after molding, the sheet retains a significant portion of its reflection luminance as compared with the reflection luminance value before molding. That is, the present invention relates to a sealed lens type retroreflective sheet which, at the time of molding, enables a resin with the retroreflective sheet mounted thereon to be stretched to a desired form without undesirable deterioration in its optical properties.

BACKGROUND

In conventional sealed lens type retroreflective sheet, a transparent microspherical lens is independently embedded in a transparent anchoring layer, and a metallic reflective layer is provided on the back side of the microspherical lens through a focal resin layer. In these sealed lens type retroreflective sheet, since a microspherical lens is embedded in a thin sheet material, problems occur such as embrittlement and blister. Further, such a retroreflective sheet is unsuitable for co-molding wherein the retroreflective sheet is molded together with a substrate on which the retroreflective sheet is to be laminated. For this reason, Japanese Unexamined Patent Publication (Kokai) No. 63-27884 and U.S. Pat. No. 4,983,436 (Bailey et al.) disclose that a single backing film layer is provided to reinforce the sheet, thereby solving the embrittlement problem. On the other hand, in Japanese Unexamined Patent Publication (Kokai) No. 59-5051, stretching is carried out so as to cause cracking in a metallic reflective layer to prepare an intermediate product having discontinuous portions, and, thereafter, the other layers are formed. That is, the blister problem is solved by improving the air permeability.

Mounting of a sealed lens type retroreflective sheet on a flat substrate has hitherto been performed by contact-bonding the sheet to the substrate by taking advantage of a pressure-sensitive adhesive provided on the surface of the sheet remote from the reflecting surface. Further, in the case of mounting of a retroreflective sheet on an uneven surface like a gentle quadratic surface, contact bonding has been used as with the case of the flat substrate. In these cases, the retroreflectivity of the retroreflective sheet can be maintained after mounting because the retroreflective sheet per se is not substantially stretched by the mounting operation. This method, however, is unsuitable for mounting on a quadratic surface having sharp irregularities because the sheet cannot be exactly fitted to such a surface without leaving any space. For this reason, a co-molding method is used wherein the retroreflective sheet is mounted when the resin is molded by injection molding or blow molding. In this case, the retroreflective sheet is stretched. The stretching of the sheet results in stretching of the focal resin layer. This means that the resin constituting the focal resin layer, for example, polyvinyl butyral, is also stretched. The stretching of the focal resin layer causes the thickness of the resin layer to gradually decrease with an increase in percentage stretching, making the luminance of the sheet decrease. Further stretching thereof causes large cracks in the focal resin layer, making it impossible to maintain the appearance as before the molding.

SUMMARY OF THE INVENTION

The present invention provides, in one aspect, a sealed lens type retroreflective sheet having good appearance, which is suitable for co-molding by injection molding, blow molding or the like wherein the retroreflective sheet can be laid within a mold for a substrate, the sheet and a molding resin can be combined to form a molded product, and, after molding, the sheet retains a significant portion of its reflection luminance as compared with the reflection luminance value before molding.

A preferred sealed lens retroreflective sheet of the invention can be used for co-molding, and comprises a metallic reflective layer, a microspherical lens layer disposed as a single layer, and a transparent focal resin layer disposed between the reflective layer and the microspherical lens layer, characterized in that the focal resin layer comprises a mixture of cellulose ester and polyvinyl butyral resin. Preferably, the focal resin layer consists essentially of a cellulose ester and a polyvinyl butyral resin.

DETAILED DESCRIPTION OF PREFERRED EMBODIMENTS

Specifically, the retroreflective sheet according to the present invention is suitable for co-molding wherein the sheet can be laid within a mold for a substrate and molded with a resin to form a resultant molded product. In this case, when the whole sheet is stretched to form the molded product, the focal resin layer is not stretched to the same extent as the sheet because the focal resin layer has an elongation at break which is less than the elongation at break for the whole sheet. The thickness of the focal resin layer also remains substantially unchanged, and it is uniformly and finely cracked by individual microspherical lens particles or groups of particles. Further, the metallic reflective layer exhibits substantially the same behavior as the focal resin layer and causes uniform and fine cracking. Due to the uniform and fine cracks, the appearance of the retroreflective sheet does not deteriorate. Further, the relative positions of the spherical lens and the metallic reflective layer remain substantially unchanged for each particle or particle group formed by cracking, thus enabling the focal point to remain substantially unchanged in many portions. Therefore, there is a reduced decrease in reflection luminance due to molding.

Figure 1:
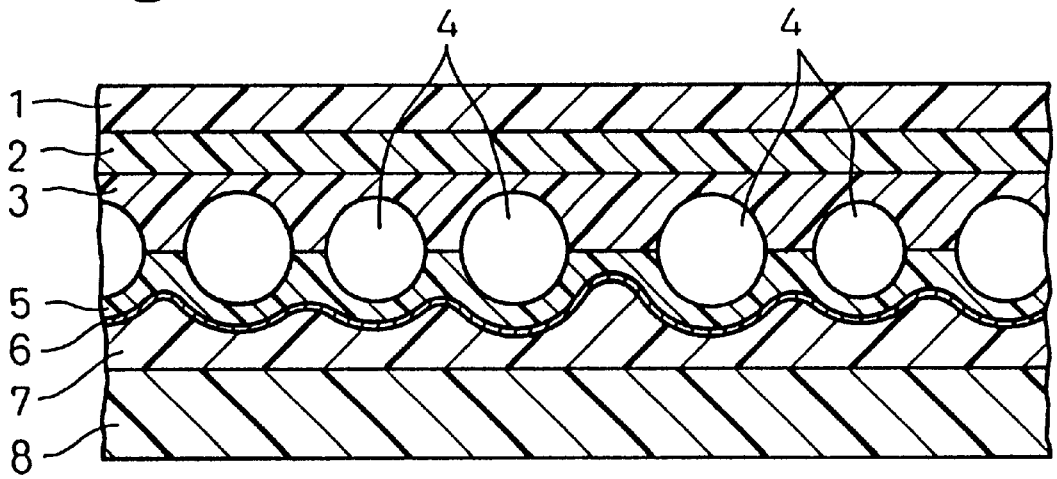
FIG. 1 is a cross-sectional view of a representative structure of a conventional retroreflective sheet and a representative structure of a retroreflective sheet of the present invention.
Figure 2:
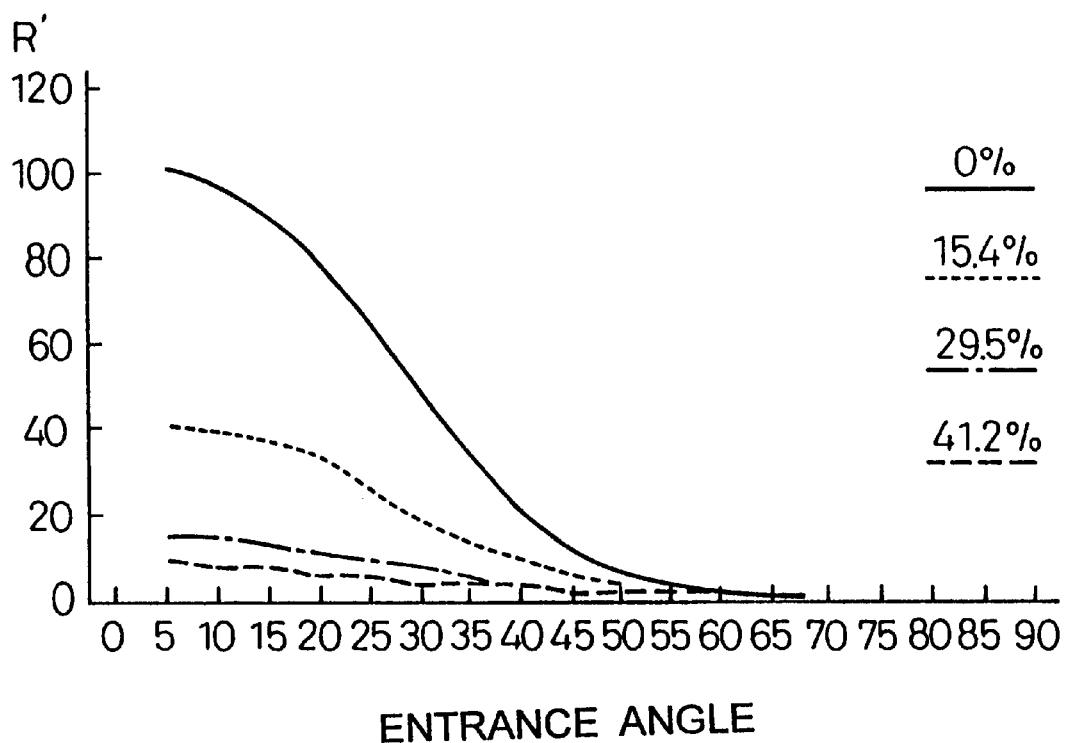
FIG. 2 is a graph showing incidence angles vs. reflection luminances (R') at an observation angle of 0.2° of a conventional retroreflective sheet.
Figure 3:
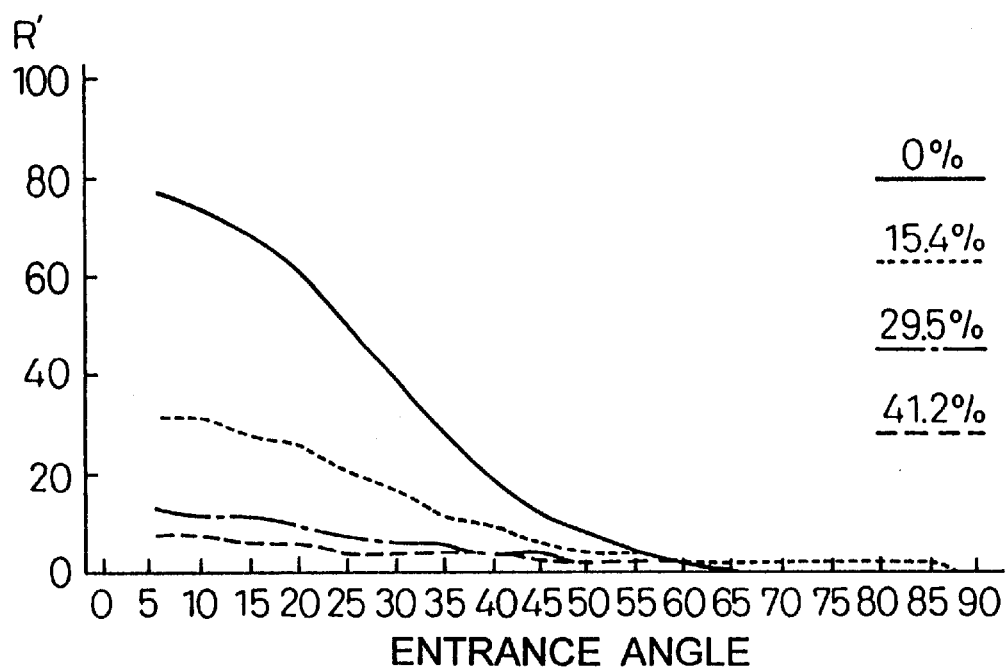
FIG. 3 is a graph showing incidence angles vs. reflection luminances (R') at an observation angle of 0.33° of a conventional retroreflective sheet.
Figure 4:
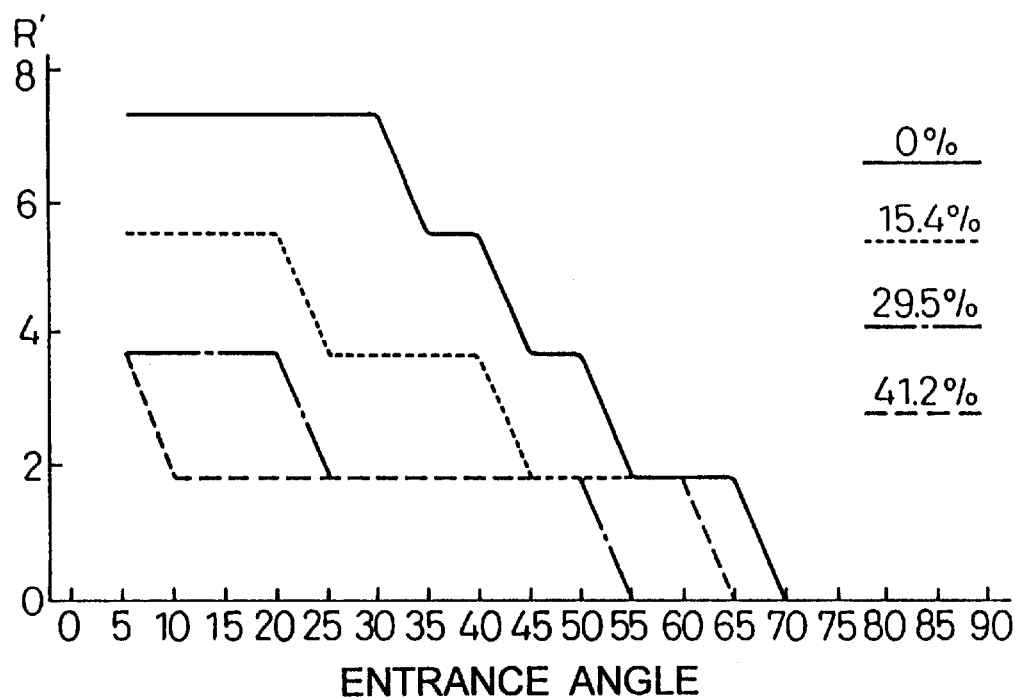
FIG. 4 is a graph showing incidence angles vs. reflection luminances (R') at an observation angle of 2° of a conventional retroreflective sheet.
Figure 5:
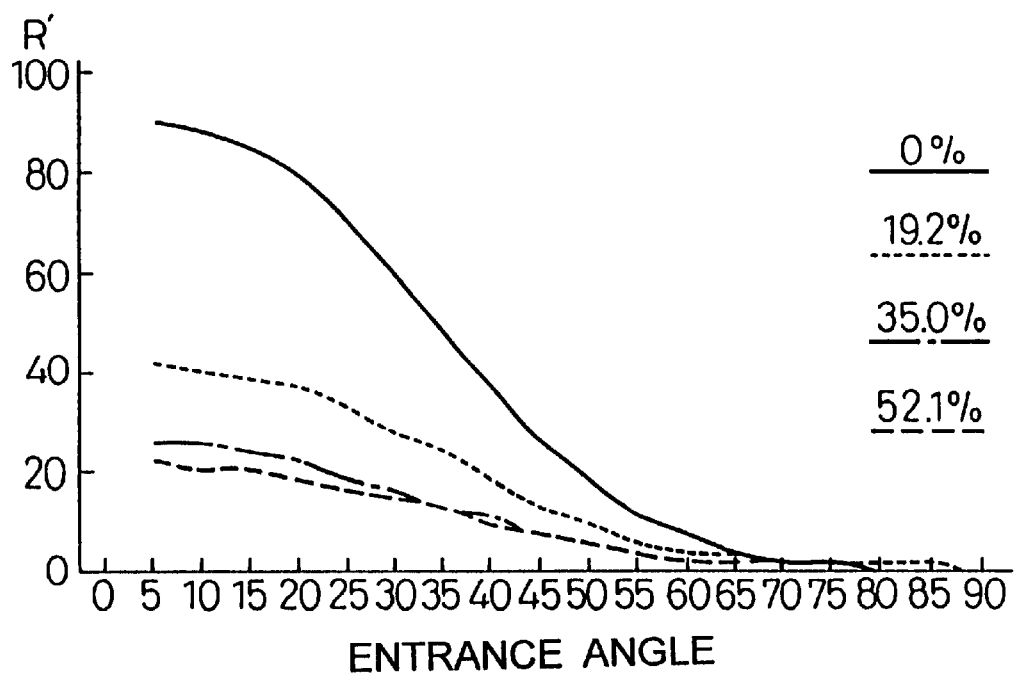
FIG. 5 is a graph showing incidence angles vs. reflection luminances (R') at an observation angle of 0.2° of a retroreflective sheet of the present invention.
Figure 6:
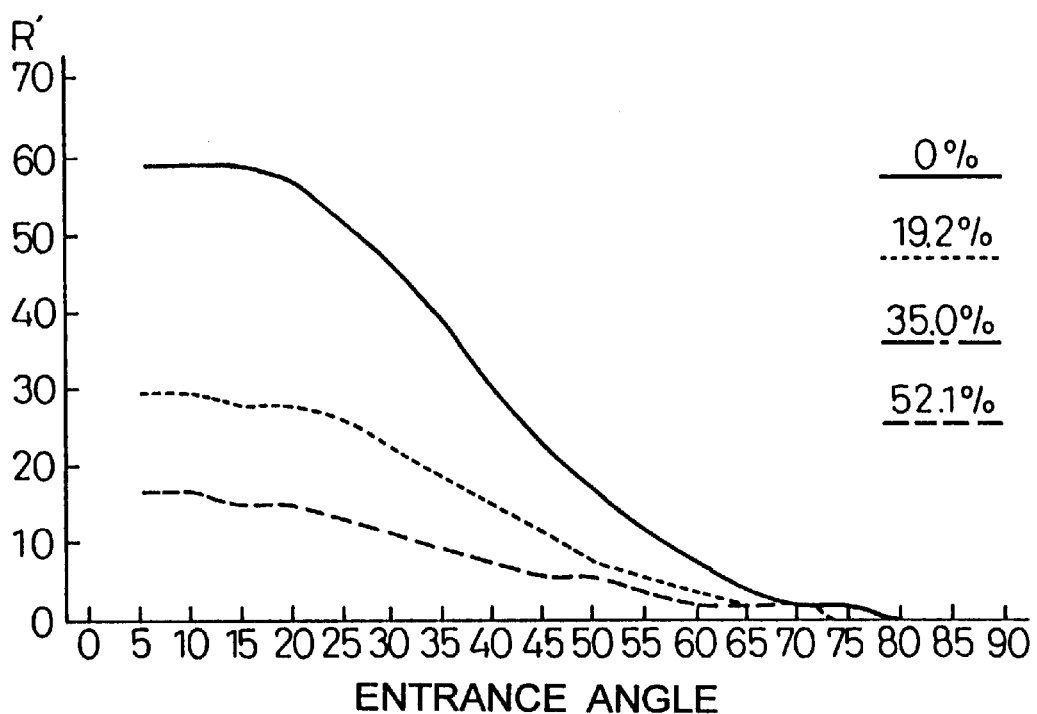
FIG. 6 is a graph showing incidence angles vs. reflection luminances (R') at an observation angle of 0.33° of a retroreflective sheet of the present invention.
Figure 7:
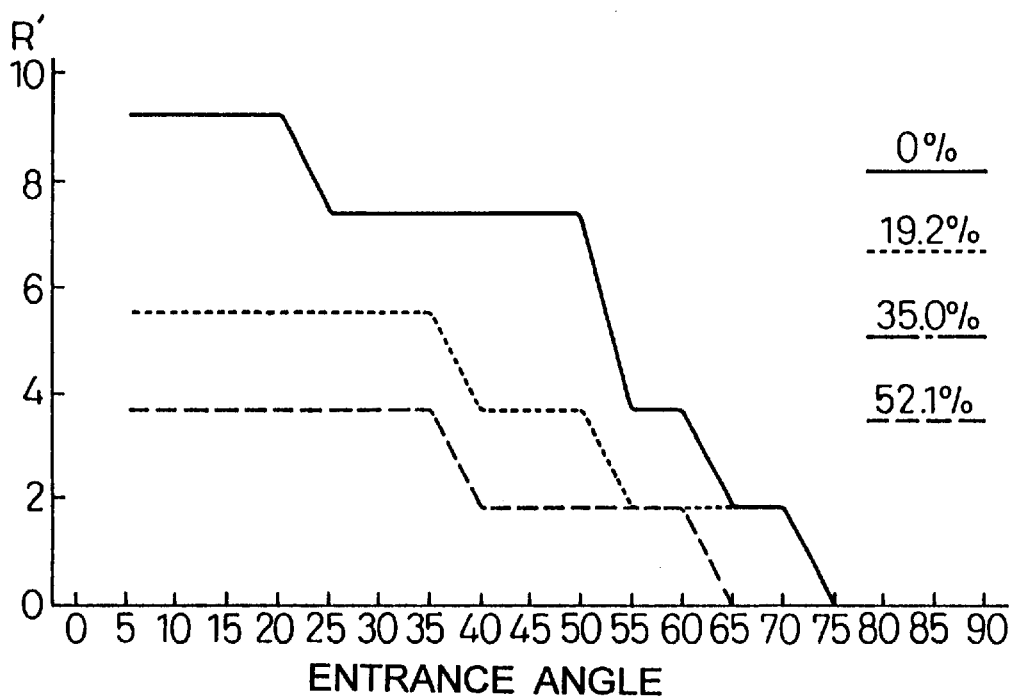
FIG. 7 is a graph showing incidence angles vs. reflection luminances (R') at an observation angle of 2° of a retroreflective sheet of the present invention.
Figure 8:
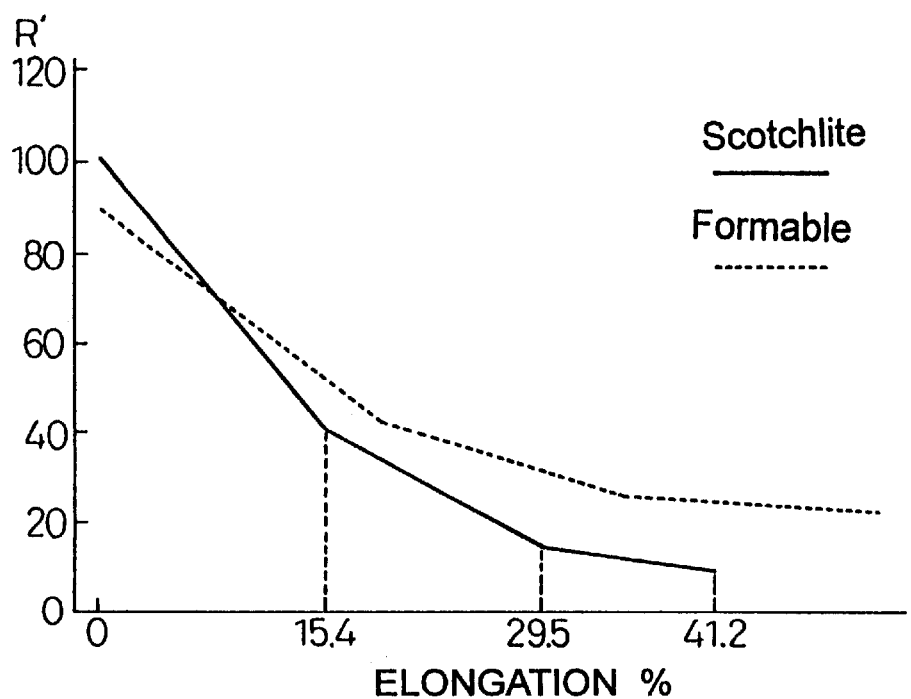
FIG. 8 is a graph showing incidence angles vs. reflection luminances (R') at an incidence angle of 5°.
Figure 9:
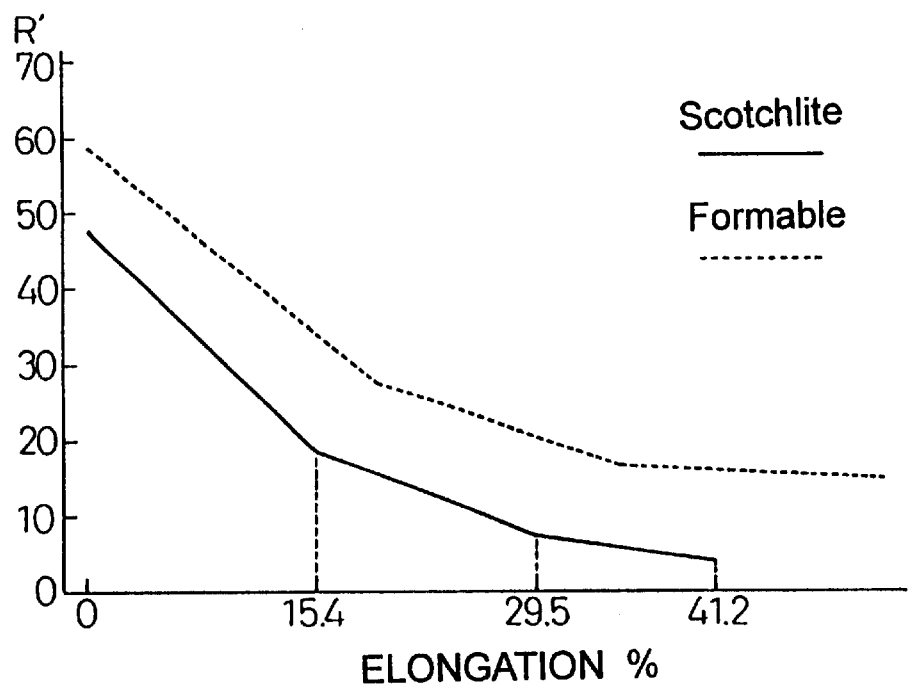
FIG. 9 is a graph showing incidence angles vs. reflection luminances (R') at an incidence angle of 30°.
Figure 10:
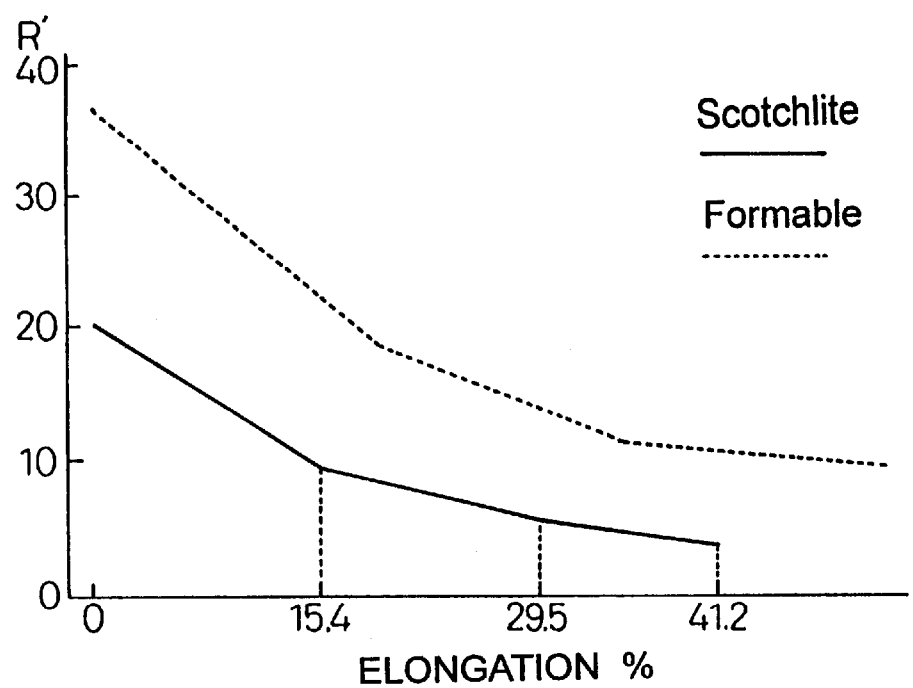
FIG. 10 is a graph showing incidence angles vs. reflection luminances (R') at an incidence angle of 40°.

As shown in FIG. 1, a typical embodiment of the retroreflective sheet according to the present invention comprises a laminate of a clear layer 1, a support layer 2, an anchoring agent layer 3, a layer 4 of a microspherical lens, a focal resin layer 5, a metallic reflective layer 6, an adhesive layer (1) 7, and an adhesive layer (2) 8. However, the retroreflective sheet according to the present invention is not limited to the retroreflective sheet having the above construction. Materials for constituting the retroreflective sheet according to the present invention may be the same as those constituting the conventional product except for the focal resin layer, so far as the following requirements are met.

The clear layer 1 may be formed of any resin having good moldability, good weather resistance, and excellent transparency, preferably urethane resin, fluororesin or the like. The thickness of the clear layer is preferably 20 µm to 150 µm. When it is less than 20 µm, the weather resistance is deteriorated, while when it exceeds 150 µm, the moldability is deteriorated.

The support layer 2 is formed of preferably a resin having good moldability, excellent transparency, and excellent adhesion to the clear layer 1 and the anchoring agent layer 3, such as PVC resin or urethane resin. The thickness of the support layer is preferably not more than about 150 µm. When it exceeds 150 µm, the transparency and the moldability are deteriorated. When the total thickness of the clear layer 1 and the adhesive layer (2) exceeds 100 µm, sufficient strength for withstanding molding is ensured enabling the support layer to be omitted.

The anchoring agent layer 3 is formed of preferably a resin having good moldability, excellent transparency, and excellent adhesion to the support layer 2 and the microspherical lens 4, such as a urethane resin. The thickness of the anchoring agent layer is preferably such that the microspherical lens is embedded therein by half. When it is excessively small, the adhesion of the microspherical lens is deteriorated, while when it is excessively large, the retroreflectivity is lost.

The microspherical lens 4 is formed of preferably a glass having a refractive index of 2.2 to 2.3. When the refractive index is less than 2.2, it becomes difficult to reproduce the retroreflectivity. A material having a refractive index exceeding 2.3 is difficult to prepare on a commercial scale. The microspheres preferably have an average diameter of about 30 um to about 100 µm, more preferably about 50 µm to about 80 µm.

The metallic reflective layer 6 is preferably formed by vapor deposition of a metal. The vapor deposition product of a metal having good adhesion to the focal resin layer 5 and the adhesive layer (1) 7 and high reflectivity, such as aluminum or tin, is preferred. The thickness of the reflective layer 6 is preferably 300 angstrom (Å) to 800 Å. When it is less than 300 Å, the amount of light passed through this layer becomes large, that is, the reflectivity is deteriorated. On the other hand, when the thickness exceeds 800 Å, the reflectivity may become saturated.

The adhesive layer (1) 7 preferably is employed when the reflective layer 6 has poor adhesion to the adhesive layer (2) 8. Since the adhesive layer (2) 8 is typically formed of an olefin or an ABS resin which often is the same material as the substrate which will be adhered to the adhesive layer (2) 8, the adhesive layer (1) 7 is preferably formed of a urethane adhesive. The thickness of this layer is preferably such that the microspherical lens is embedded therein at least by half. When it is smaller than this, the adhesion to the microspherical lens is deteriorated. The upper limit of the thickness of the adhesive layer (1) 7 is preferably a value of (a thickness sufficient to embed the microspherical lens by half+50 µm). When the thickness exceeds this value, the moldability may be deteriorated.

As described above, the adhesive layer (2) 8 is formed of an olefin resin or an ABS resin which is the same material as the substrate. The thickness of the adhesive layer (2) 8 is preferably 20 µm to 150 µm. When it is less than 20 µm, the productivity may be lowered, while when it exceeds 150 µm, the moldability may be lowered.

The focal resin layer 5 preferably has excellent transparency, and the elongation at break of the focal resin layer 5 per se preferably is 0 to about 25%. Preferably, this resin layer is formed of a mixture substantially of a polyvinyl butyral resin, having a good adhesion to the microspherical lens layer and the metallic reflective layer, with a brittle cellulose ester. Preferably, the cellulose ester is a cellulose acetate propionate or a cellulose acetate (hereinafter referred to as "cellulose acetate propionate or the like"). If the content of cellulose ester, such as cellulose acetate propionate or the like, is excessively high, then it is difficult to form uniform cracks in the microspherical lens layer and the metallic reflective layer, and the appearance of the sheet may deteriorate. That is, if the elongation at break of the focal resin layer is 10% or less, then the focal resin layer alone tends to form uniform cracks (see Table 4). However, if the ratio of polyvinyl butyral resin relative to cellulose ester such as cellulose acetate propionate or the like is too low, the adhesion of the focal resin to the microspheres may become poor. Accordingly, the weight ratio of polyvinyl butyral resin relative to cellulose ester is preferably sufficiently high to provide an adhesively effective amount of polyvinyl butyral resin, and more preferably is at least about 3:7 by weight, and most preferably is in a range from 4:6 to about 6:4. The cellulose ester is selected as one component of the resin mixture for composing the focal resin layer because the deformation is less during the molding process (at a high temperature) due to its high glass transition point. Also, it is hard and brittle, and a solution thereof in an organic solvent, which is a poor solvent, has a high viscosity and a low solid content.

The polyvinyl butyral resin is selected as another component of the focal resin layer because it has a good compatibility with the cellulose ester and a good adhesion to the microspherical lens layer. Also a solution thereof in an organic solvent which is a poor solvent has a high viscosity and a low solid content.

Examples of suitable commercially available cellulose ester resins and polyvinyl butyral resins includes cellulose ester available from Eastman Chemical Japan Ltd., Tokyo, Japan, and Butver B-76 available from Monsanto Company, St. Louis, Mo., respectively.

Preferably, the reflective sheet can generate the retroreflection in response to incident rays of various incident angles. To have such a function, the focal resin layer 5 should have a uniform thickness along the microspherical lenses 4, which state is attainable when the solid content of the focal resin solution is relatively low (about 20% by weight) and the viscosity thereof is high. Such an ideal state is obtained when this resin is dissolved in a poor solvent to cellulose acetate propionate, such as diacetone alcohol. To form the focal resin layer from this solution, the solution is poured onto the microspherical lenses half embedded into the anchoring layer, and thereafter the solvent thereof is evaporated. The preferable thickness of the focal resin layer changes when the diameter of microspherical lens changes, even if the refractive index of the microspherical lens is constant, and it also changes when the refractive index of the lens changes. A thickness of the focal resin layer is preferably in a range from 20 $\mu$m to 28 $\mu$m, more preferably from 22 $\mu$m to 26 $\mu$m if the microspherical lens has a refractive index of 2.26 and a diameter of 71 $\mu$m. If the thickness is outside this range, the retroreflectivity becomes poorer.

The retroreflective sheet of the present invention can be previously laid within a mold for a substrate and, simultaneously with molding of a resin, mounted on the resultant molded product. In this case, as compared with a retroreflective sheet using a resin which, when molded, is likely to be stretched, the thickness of the resin layer remains unchanged, and, further, the position of the microspherical lens layer relative to the metallic reflective layer remains unchanged, thus enabling the focal point to remain unchanged in many portions. Therefore, a reduction in luminance after molding is small.

EXAMPLES

Advantages of the invention are illustrated by the following examples. However, the particular materials and amounts thereof recited in these examples, as well as other conditions and details, are to be interpreted to apply broadly in the art and should not be construed to unduly limit the invention.

Example 1 and Comparative Example 1

The following samples were prepared in order to examine a change in reflection luminance after molding for the sealed lens type reflective sheet of the present invention and the conventional sealed lens type reflective sheet. A support layer, an anchoring layer, a glass bead layer, a focal resin layer and a reflective layer were formed in accordance with the procedure, described in on page 3, left top column, line 6 from bottom to right top column, line 6. In the present example and comparative example, the diameter of glass bead (microspherical lens) used was 71 $\mu$m. A solution (solid content 30%) of MACROMELT 6240 as an adhesive, manufactured by Henkel Hakusui Corp., Kankakee, Ill., in isopropanol:toluene=1:1 solvent, was coated by means of a bar coater on the reflective layer, and the coating was then dried to form a layer, having an average thickness of 20 $\mu$m, as an adhesive layer (1) 7. A 50 $\mu$m-thick polypropylene, subjected to corona discharge treatment, was heat-laminated as an adhesive layer (2) 8 at 90° C. to the adhesive layer (1) 7. The release paper provided on the surface of the support layer 2 remote from the adhesive layer (2) 8 was peeled off, NEOPAC R9000 manufactured by Zeneca Resins, Wilmington, Mass., an acrylic urethane resin, was coated by means of as bar coater on the exposed surface of the support layer 2, and the coating was then dried to form a 50 $\mu$m-thick clear layer 1. As the focal resin layer, a polyvinyl butyral resin was used. Thus, a conventional retroreflective sheet (Comparative Example 1) was prepared.

The procedure from the initial step to the step of coating glass beads described above in connection with the preparation of the conventional retroreflective sheet was repeated. Thereafter, a mixture of cellulose acetate propionate CAP-504-0.2 manufactured by Eastman Chemical and a polyvinyl butyral resin (solid content ratio=50:50) was coated by means of a bar coater to an average thickness of 20 $\mu$m to form a focal resin layer 5. Aluminum was vapor-deposited thereon to a thickness of 600 Å by using a vacuum evaporator EX-400 manufactured by Ulvac Technologies, Inc., Andover, Mass., to form a reflective layer 6. A clear layer 1 and the adhesive layers (1) 7 and (2) 8 were prepared and laminated in the same manner as described above in connection with the preparation of the conventional retroreflective sheet, thereby preparing a retroreflective sheet of the present invention (Example 1).

Samples for the measurement of reflection luminance after molding were prepared from the two retroreflective sheets thus prepared. Samples having a size of 13 cm×25 cm from these retroreflective sheets were stretched by 1 time, 1.25 times, 1.5 times, and 1.75 times in the longitudinal direction at a rate of 100 mm/minute with a chuck width of 2.5 cm (distance between upper and lower chucks: 20 cm) by using a tensile tester UCT-100 manufactured by Orientec Company Ltd., Tokyo, Japan, and laminated onto an aluminum sheet coated with an adhesive. After the lamination, the percentage stretching in terms of the actually stretched area was measured, and the peripheral portion of the samples (that is, the whole area except for the central area 8 cm×15 cm) was masked with a pressure-sensitive paper tape to prepare samples for the measurement of reflection luminance. The reflection luminance was measured according to JIS Z9117-1984, provided that sample area 8 cm×15 cm was used instead of the sample area 21 cm×15 cm. Specifically, the coefficient of reflection luminance, R', was measured under conditions of angles of observation of 0.2°, 0.33°, and 2° and angles of incidence of 5° to 90° in an increment of 5° to compare the reflection luminance before stretching with that after stretching. The results are shown in Tables 1 and 2 and FIGS. 2 to 10.

TABLE 1

REFLECTION LUMINANCE OF CONVENTIONAL RETROREFLECTIVE SHEET (COMPARATIVE EXAMPLE 1)

| Angle of incidence | 1 time: stretching 0% Angle of observation (°) | | | 1.25 times: stretching 15.4% Angle of observation (°) | | | 1.5 times: stretching 29.5% Angle of observation (°) | | | 1.75 times: stretching 41.2% Angle of observation (°) | | |
|---|---|---|---|---|---|---|---|---|---|---|---|---|
| | 0.2 | 0.33 | 2 | 0.2 | 0.33 | 2 | 0.2 | 0.33 | 2 | 0.2 | 0.33 | 2 |
| 5 | 101 | 77.2 | 7.35 | 40.4 | 31.2 | 5.51 | 14.7 | 12.8 | 3.67 | 9.19 | 7.35 | 3.67 |
| 10 | 97.4 | 73.5 | 7.35 | 38.6 | 31.2 | 5.51 | 14.7 | 11 | 3.67 | 7.35 | 7.35 | 1.83 |
| 15 | 90 | 68 | 7.35 | 36.7 | 27.5 | 5.51 | 12.8 | 11 | 3.67 | 7.35 | 5.51 | 1.83 |
| 20 | 79 | 60.6 | 7.35 | 33 | 25.7 | 5.51 | 11 | 9.19 | 3.67 | 5.51 | 5.51 | 1.83 |
| 25 | 64.3 | 49.6 | 7.35 | 25.7 | 20.2 | 3.67 | 9.19 | 7.35 | 1.83 | 5.51 | 3.67 | 1.83 |
| 30 | 47.7 | 38.6 | 7.35 | 18.3 | 16.5 | 3.67 | 7.35 | 5.51 | 1.83 | 3.67 | 3.67 | 1.83 |
| 35 | 33 | 27.5 | 5.51 | 12.8 | 11 | 3.67 | 5.51 | 5.51 | 1.83 | 3.67 | 3.67 | 1.83 |
| 40 | 20.2 | 18.3 | 5.51 | 9.19 | 9.19 | 3.67 | 3.67 | 3.67 | 1.83 | 3.67 | 3.67 | 1.83 |
| 45 | 11 | 11 | 3.67 | 5.51 | 5.51 | 1.83 | 3.67 | 3.67 | 1.83 | 1.83 | 1.83 | 1.83 |
| 50 | 5.51 | 7.35 | 3.67 | 3.67 | 3.67 | 1.83 | 3.67 | 1.83 | 1.83 | 1.83 | 1.83 | 1.83 |
| 55 | 3.67 | 3.67 | 1.83 | 3.67 | 3.67 | 1.83 | 1.83 | 1.83 | 0 | 1.83 | 1.83 | 1.83 |
| 60 | 1.83 | 1.83 | 1.83 | 1.83 | 1.83 | 1.83 | 1.83 | 1.83 | 0 | 1.83 | 1.83 | 1.83 |
| 65 | 1.83 | 0 | 1.83 | 1.83 | 1.83 | 1.83 | 1.83 | 1.83 | 0 | 1.83 | 1.83 | 0 |
| 70 | 0 | 0 | 0 | 1.83 | 1.83 | 0 | 0 | 0 | 0 | 1.83 | 0 | 0 |
| 75 | 0 | 0 | 0 | 1.83 | 1.83 | 0 | 0 | 0 | 0 | 0 | 0 | 0 |
| 80 | 0 | 0 | 0 | 0 | 1.83 | 0 | 0 | 0 | 0 | 0 | 0 | 0 |
| 85 | 0 | 0 | 0 | 0 | 1.83 | 0 | 0 | 0 | 0 | 0 | 0 | 0 |
| 90 | 0 | 0 | 0 | 0 | 0 | 0 | 0 | 0 | 0 | 0 | 0 | 0 |

TABLE 2

REFLECTION LUMINANCE OF RETROREFLECTIVE SHEET OF THE PRESENT INVENTION (EXAMPLE 1)

| Angle of incidence | 1 time: stretching 0% Angle of observation (°) | | | 1.25 times: stretching 19.2% Angle of observation (°) | | | 1.5 times: stretching 35.0% Angle of observation (°) | | | 1.75 times: stretching 52.1% Angle of observation (°) | | |
|---|---|---|---|---|---|---|---|---|---|---|---|---|
| | 0.2 | 0.33 | 2 | 0.2 | 0.33 | 2 | 0.2 | 0.33 | 2 | 0.2 | 0.33 | 2 |
| 5 | 90 | 58.8 | 9.19 | 42.2 | 29.4 | 5.51 | 25.7 | 20.2 | 3.67 | 22 | 16.5 | 3.67 |
| 10 | 88.2 | 58.8 | 9.19 | 40.4 | 29.4 | 5.51 | 25.7 | 18.3 | 3.67 | 20.2 | 16.5 | 3.67 |
| 15 | 84.5 | 58.8 | 9.19 | 38.6 | 27.5 | 5.51 | 23.8 | 18.3 | 3.67 | 20.2 | 14.7 | 3.67 |
| 20 | 79 | 56.9 | 9.19 | 36.7 | 27.5 | 5.51 | 22 | 16.6 | 3.67 | 18.3 | 14.7 | 3.67 |
| 25 | 69.8 | 51.4 | 7.35 | 33 | 25.7 | 5.51 | 18.3 | 14.7 | 3.67 | 16.5 | 12.8 | 3.67 |
| 30 | 58.8 | 45.9 | 7.35 | 27.5 | 22 | 5.51 | 16.5 | 12.8 | 3.67 | 14.7 | 17 | 3.67 |
| 35 | 47.7 | 38.6 | 7.35 | 23.8 | 18.3 | 5.51 | 12.8 | 11 | 3.67 | 12.8 | 9.19 | 3.67 |
| 40 | 36.7 | 29.4 | 7.35 | 18.3 | 14.7 | 3.67 | 11 | 9.19 | 1.83 | 9.19 | 7.35 | 1.83 |
| 45 | 25.7 | 22 | 7.35 | 12.8 | 11 | 3.67 | 7.35 | 7.35 | 1.83 | 7.35 | 5.51 | 1.83 |
| 50 | 18.3 | 16.5 | 5.51 | 9.19 | 7.35 | 3.67 | 5.51 | 5.51 | 1.83 | 5.51 | 5.51 | 1.83 |
| 55 | 11 | 11 | 3.67 | 5.51 | 5.51 | 1.83 | 3.67 | 3.67 | 1.83 | 3.67 | 3.67 | 1.83 |
| 60 | 7.35 | 7.35 | 3.67 | 3.67 | 3.67 | 1.83 | 1.83 | 1.83 | 1.83 | 1.83 | 1.83 | 1.83 |
| 65 | 3.67 | 3.67 | 1.83 | 3.67 | 1.83 | 1.83 | 1.83 | 1.83 | 0 | 1.83 | 1.83 | 0 |
| 70 | 1.83 | 1.83 | 1.83 | 1.83 | 1.83 | 1.83 | 1.83 | 1.83 | 0 | 1.83 | 1.83 | 0 |
| 75 | 1.83 | 1.83 | 0 | 1.83 | 1.83 | 0 | 0 | 0 | 0 | 1.83 | 0 | 0 |
| 80 | 0 | 0 | 0 | 1.83 | 0 | 0 | 0 | 0 | 0 | 0 | 0 | 0 |
| 85 | 0 | 0 | 0 | 1.83 | 0 | 0 | 0 | 0 | 0 | 0 | 0 | 0 |
| 90 | 0 | 0 | 0 | 0 | 0 | 0 | 0 | 0 | 0 | 0 | 0 | 0 |

From the above Tables 1 and 2 and FIGS. 2 to 10, regarding the reduction in reflection luminance after molding as compared with the reflection luminance before molding, the retroreflective sheet of the present invention exhibits better retention of reflection luminance than the conventional retroreflective sheet. This is derived from the difference in the material constituting the focal resin layer between the retroreflective sheet of the present invention and the conventional retroreflective sheet.

Example 2

Tests were carried out for confirming whether or not the appearance of the retroreflective sheet remains unchanged due to the existence of cracking in the focal resin layer generated after the molding as compared with prior to the molding.

Samples were prepared in the same manner as Example 1, except that the average thickness of the focal resin layer is made to vary from 10 μm to 150 μm so that a size of fracture of the focal resin layer varies in the molding.

These samples were stretched by 1.25 times by using the same tensile tester as Example 1, and the appearance uniformly thereof was observed at a distance 1.0 m in a 90° C. direction from the sample, while using a standard light source manufactured by the Macbeth Division of Kollmorgen Instr. Corp., New Windsor, N.Y. The test results were evaluated by a three rank method; good, fair, bad.

TABLE 3

| Focal resin layer | Uniformity of appearance | | | | | |
|---|---|---|---|---|---|---|
| Fracture size | Panel A | Panel B | Panel C | Panel D | Panel E | Total |
| <0.5 mm | good | good | good | good | good | good |
| 0.5 to 1.0 mm | good | good | good | good | good | good |
| 1.0 to 2.0 mm | fair | good | fair | fair | bad | fair |
| >2.0 mm | bad | bad | bad | bad | bad | bad |

From the above Table 3, it was confirmed that, when the fracture size is 2.0 mm or less, the appearance of the retroreflective sheet according to the present invention remains nearly unchanged even after the molding, and if the fracture size is 1 mm or less, a more favorable appearance is maintained, closer to that prior to molding.

Example 3

A tensile strength and an elongation at break of the focal resin layer alone; a tensile strength, an elongation at break and an evenness of crack generation (uniformity of appearance), and an adhesion between the focal resin layer and the glass beads of the retroreflective sheet were measured as follows:

(a) A film of 25 μm thick was prepared by coating a solution of polybutyral resin and/or cellulose acetate propionate CAP-504-0.2 produced by Eastman Chemical in a 1:1 mixture of Ipzol #150 produced by Godo Solvent K.K., Tokyo, Japan, and cyclohexanone on a non-treated PET film, drying the coated film in an oven, and peeling the polyvinyl butyral film or others off from the PET film. The thus obtained film was cut into pieces of 2.5 cm×15 cm to be test samples.

(b) A retroreflective sheet was prepared in the same manner as Example 1, while using the resin in the test samples (a) as a focal resin layers to have the same thickness, which sheet was cut into pieces of 2.5 cm×15 cm to be test samples.

The above two kinds of test samples were subjected to a tensile test for obtaining the elongation at break (in Table 4, merely referred to as "elongation") and the tensile strength while using a tensile tester UCT-100 provided by Orientec, with a grip width of 2.5 cm at a normal temperature and a stretching rate of 300 mm/min. Further, the evenness of crack generation (which is the same as uniformity of appearance in Example 2) and the adhesion between the focal resin layer and the glass beads was visually evaluated on the test samples (b). If the focal resin had poor adhesion to the microspheres (denoted in Table 4 as "no good"), then the resin tended to peel away from the microspheres when the focal resin cracked during sample elongation.

These results were listed in Table 4. In Table 4, the polyvinyl butyral resin is merely referred to as "butyral"; the elongation at break as "elongation"; and the adhesion between the focal resin layer and the glass beads as "adhesion".

As apparent from Table 4, if the elongation is 10% or less, the focal resin layer alone generates uniform cracks in the retroreflective sheet, and if the ratio of the polyvinyl butyral resin relative to the sum of itself and the cellulose acetate propionate by weight is 3/10 or less, the adhesion between the focal resin layer and the glass beads becomes poor.

TABLE 4

| Butyral: | Focal resin layer alone | | Retroreflective sheet | | | |
|---|---|---|---|---|---|---|
| Cap-504-0.2 weight % | Strength (kgf) | Elongation (%) | Strength (kgf) | Elongation (%) | Crack evenness | Adhesion |
| 10:0 | 2.19 | 63.0 | 10.82 | 195.5 | no good | good |
| 9:1 | 1.91 | 43.3 | 10.26 | 189.0 | no good | good |
| 8:2 | 1.84 | 21.1 | 10.54 | 187.3 | no good | good |
| 7:3 | 1.91 | 33.6 | 10.05 | 172.6 | no good | good |
| 6:4 | 2.55 | 8.46 | 9.86 | 165.9 | good | good |
| 5:5 | 2.35 | 3.51 | 10.55 | 168.2 | good | good |
| 4:6 | 2.15 | 3.45 | 11.03 | 170.1 | good | good |
| 3:7 | 2.45 | 4.12 | 10.79 | 177.4 | good | no good |
| 2:8 | 2.42 | 3.27 | 10.28 | 165.2 | good | no good |
| 1:9 | 1.63 | 2.24 | 9.73 | 162.0 | good | no good |
| 0:10 | 1.88 | 2.58 | 9.95 | 154.6 | good | no good |

The foregoing detailed description and examples have been given for clarity of understanding only. No unnecessary limitations are to be understood therefrom. The invention is not limited to the exact details shown and described, for variations apparent to one skilled in the art will be included within the invention defined by the claims.

what is claimed is:

1. A retroreflective sheet useful for co-molding, comprising a metallic reflective layer, a microspherical lens layer disposed as a single layer, and a transparent focal resin layer disposed between the reflective layer and the microspherical lens layer, wherein the focal resin layer comprises a mixture of cellulose ester and polyvinyl butyral resin.

2. A retroreflective sheet according to claim 1, wherein the cellulose ester comprises cellulose acetate.

3. A retroreflective sheet according to claim 1, wherein the cellulose ester comprises cellulose acetate propionate.

4. A retroreflective sheet according to claim 1, wherein the focal resin layer consists essentially of cellulose ester and polyvinyl butyral resin.

5. A retroreflective sheet according to claim 1, wherein the cellulose ester and the polyvinyl butyral resin are present in the focal resin layer in a weight ratio of from about 4:6 to about 6:4.

6. A retroreflective sheet according to claim 5, wherein the microspherical lens layer comprises microspheres comprising glass having a refractive index of 2.2 to 2.3.

7. A retroreflective sheet according to claim 6, wherein the metallic reflective layer has a thickness of about 300 Å to about 800 Å.

8. A retroreflective sheet according to claim 1, wherein the microspherical lens layer is embedded in an anchoring agent layer which is disposed on a support layer.

9. A retroreflective sheet according to claim 8, wherein the metallic reflective layer has two adhesive layers disposed thereon.

10. A molded retroreflective article having a curved surface, comprising a retroreflective sheet according to claim 1 and a co-molded resin.

11. A molded retroreflective article according to claim 10, wherein the sheet retains a significant portion of its reflection luminance as compared with the reflection luminance value of the sheet before co-molding.

12. A molded retroreflective article according to claim 10, wherein the focal resin is uniformly and finely cracked between individual microspherical lenses or groups of lenses.

\* \* \* \* \*

UNITED STATES PATENT AND TRADEMARK OFFICE
CERTIFICATE OF CORRECTION

PATENT NO. : 6,221,496 B1
DATED : April 24, 2001
INVENTOR(S) : Yutaka Mori

It is certified that error appears in the above-identified patent and that said Letters Patent is hereby corrected as shown below:

Column 1,
Line 34, "63-27884" should read -- 63-278844 --

Column 3,
Line 50, please add -- . -- after "half".

Column 4,
Line 12, please add -- . -- after "half".

Signed and Sealed this

Fourteenth Day of January, 2003

JAMES E. ROGAN
*Director of the United States Patent and Trademark Office*